June 18, 1935.  J. WILDER  2,005,121
DEFLECTOR FOR GAS STOVES OR THE LIKE
Filed Jan. 27, 1934
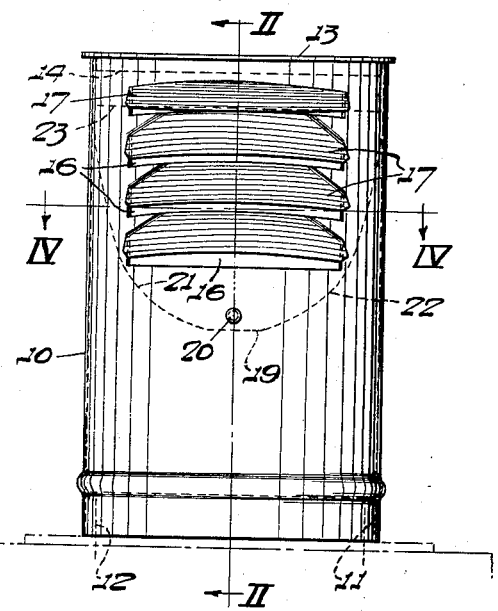
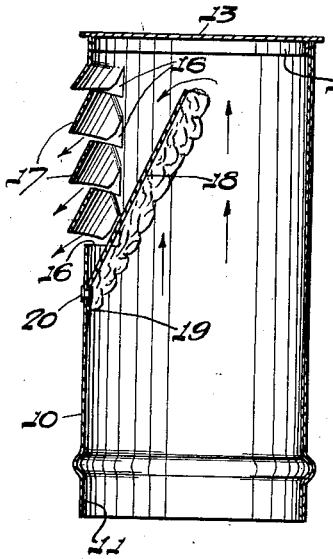
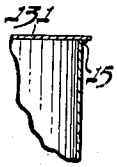
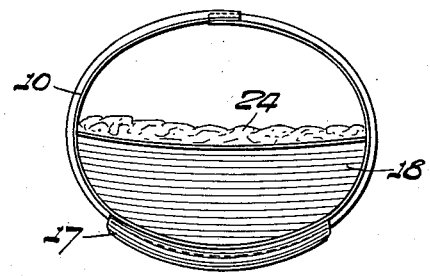
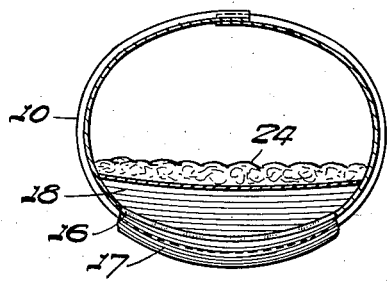
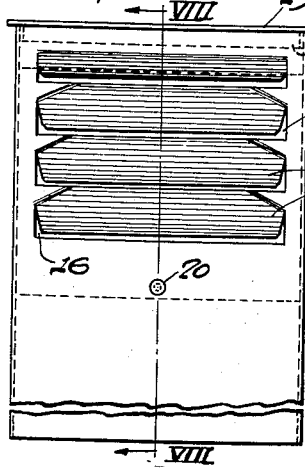
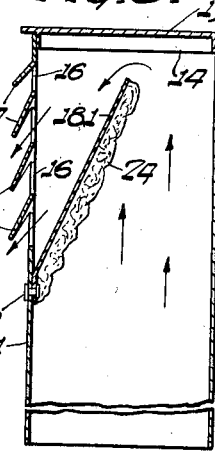
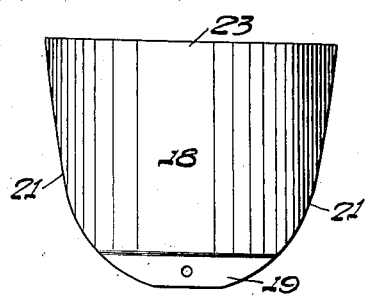
INVENTOR
John Wilder,
BY W. Schornborn.
ATTORNEY Patented June 18, 1935

2,005,121

UNITED STATES PATENT OFFICE 2,005,121

DEFLECTOR FOR GAS STOVES, OR THE LIKE

John Wilder, Niles, Ohio, assignor to Wilder Metal Company, Niles, Ohio, a corporation of Delaware Application January 27, 1934, Serial No. 708,671

3 Claims. (Cl. 126—299)

This invention relates generally to deflectors for gas stoves, or the like, to direct the smoke, fumes, soot, grease, or other noxious products evaporated or distilled from food while being cooked, so as to collect or dissipate them in substantial measure instead of allowing them to collect on the wall or precipitate upon the top of the oven.

The object of the invention is to provide a deflector of the above character which is not only capable of efficiently carrying out the above recited functions but at the same time is of unusual simplicity, few parts, minimum cost of manufacture, weight and space in shipment, having no element of structure exposed that can be disarranged or broken, and capable of being easily attached or removed from the oven, its interior readily inspected, cleaned or repaired without skilled labor or any danger of destroying the proper operative relation of its parts.

Other objects and advantages of the invention will be manifest and appear from the detailed description of the construction and manner of operation to be later explained.

The invention consists of structural characteristics and relative arrangement of parts to be hereinafter given and particularly pointed out in the appended claims.

In the one sheet of drawing, in which similar reference characters indicate the same part in the several figures, Figure 1 is a front elevational view of the deflector;

Figure 2 is a vertical sectional view taken on line II—II of Figure 1;

Figure 3 is a top plan view looking into the interior of the deflector after imperforate top is removed;

Figure 4 is a transverse sectional view taken on line IV—IV of Figure 1;

Figure 5 is a front elevational view of the imperforate deflecting plate removed from the interior of the deflector;

Figure 6 is a fragmentary sectional view of a modified form of top of the deflector;

Figure 7 is a front elevational view, similar to that of Figure 1, of a modified form; and, Figure 8 is a vertical sectional view taken on line VIII—VIII of Figure 7.

Referring to Figures 1 to 5, inclusive, the invention comprises a collar, tube or chimney 10, made of sheet metal and adapted to be fitted at its lower open end 11 on the flue outlet flange or vent 12 of a cooking stove, shown by dotted lines in Figure 1, and while said collar or tube 10 is preferably, as shown, elliptical in cross section, it may be any other cross section without departing from the spirit of the present invention or changing its mode of operation.

The top opening of said collar or tube 10 is preferably closed or sealed by a removable cap or cover 13 having a flange 14 fitting snugly within said top opening, as shown in Figure 2, the removability of said cap 13 permits ready access to the interior of the deflector for purposes of inspection and removing any grease or soot deposited within the same.

The top opening of the collar or tube 10 may be permanently closed by attaching a cover 131 by means of solder 15, or otherwise, as shown, for example, in Figure 6.

On one side of the metal collar or tube 10 is provided preferably a series of separated superimposed openings 16, which are formed by cutting elongated U-shaped slits in the metal collar or tube 10 at predetermined points and then forcing outwardly said slitted sections to form louvers 17 extending over said openings 16 and projecting beyond the contour of the collar or tube 10, as clearly shown in Figures 1 and 2.

While I have shown four openings 16 extending from the top down to a short distance above the middle section of the collar or tube 10, the number, size and shape of said openings 16 and area occupied on side of collar 10 may be, as will be readily understood, greatly varied without in any way modifying the essential features of the invention or materially destroying the efficient operation and advantages of construction herein pointed out; all that is necessary is to have the summation of the cross sectional areas of said openings 16 sufficient to permit the products of combustion or vapors issuing through the oven vent 11 to be diffused gently and unobstructedly into the air, thereby obviating the objectional blast or forceful flow of said vapors from the deflector to the annoyance of a person in proximity to the oven.

The louvers 17, as will be seen, are directly made from the material comprising the collar or tube 10, without any means for attaching same or additional weight, and prevent any down draft within the deflector to combat and retard the uniform and proper circulation of the vapors through the deflector.

Attached to the interior of the collar or tube 10 is an imperforate deflecting plate 18, preferably and substantially semi-elliptical in shape, as shown in Figure 5, which has a rounded end 19 secured by a rivet 20, or spot welded, if desired, at a section below the lowest opening 16, as shown in Figure 2, and so arranged that its curved contour or periphery 21 (see Figure 5) is directly and intimately in contact with the inner wall of the tube or collar 10 at the curved dotted line 22, indicated in Figure 1, and is inclined towards the longitudinal axis of said tube or collar 10, with its transverse straight upper edge 23 below the inner surface or wall of the cover or cap 13, as shown, thereby forming a circuitous passage of inverted U-shape within said tube or collar 10 and compelling the vapors or gases to follow the indirect path from the opening 11 to openings 16, as indicated by arrows shown in Figures 2 and 8.

The inclined underside of the imperforate plate 18 may have attached thereto a layer of asbestos wool 24, or other fume or grease absorbing material, against which the vapors or gases will impinge during their circuitous passage through the deflector, and owing to said wool 24 being on the underside of said plate 18 and entirely visible through the open bottom 11 of the collar, conduit or tube 10 after being disconnected from the flue outlet flange 12, said wool can be quickly examined, cleaned, removed or replaced, or scrape the inner surface of the collar 10, without in any way being compelled to disconnect or adjust any of the parts of the deflector to replace the same on flue outlet flange 12.

Figures 7 and 8 show substantially the same invention, with the exception that the cross section of the conduit, tube or collar 101 is rectangular in cross section and the imperforate deflecting plate 181 is likewise rectangular in outline instead of semi-elliptical, and, in view of the detailed description given with reference to Figures 1 to 6, no further explanation is necessary for the full understanding of the same.

It will be readily understood from the construction and arrangement of parts and mode of operation that all up and down drafts within the deflector will be eliminated and such operations and advantages are effected without the use of a damper or equivalent expedient, thereby materially reducing the cost of manufacture of parts and time for assembling the same.

From the foregoing disclosure, it will be seen that the complete deflector comprises solely and necessitates the manufacture of only three inexpensive blanks or parts, namely, the sheet to form the conduit or tube 10, in which the outlet openings 16 and louvers 17 can be formed, the inclined deflector plate 18, and the cover 13, each of which can be quickly fabricated, assembled and finished with a minimum of time, labor and initial cost of material and machinery.

It is also manifest that all the advantages and functions pointed out in the statement of invention have been fully and expeditiously carried out, and changes would readily suggest themselves without in any way departing from the scope of the claims.

What I claim is:

1. A deflector for gas stoves or the like, comprising a conduit having an open lower end forming a free inlet adapted for attachment to the flue outlet of an oven and closed at its upper end and having an outlet opening in the wall thereof in proximity to its closed upper end, an imperforate deflecting plate within said conduit and disposed at an angle to the conduit wall and having its lower end in contact with and secured to the conduit wall between said outlet opening and open lower end and its other end spaced from said closed upper end and the conduit wall having said outlet opening and its side edges in contact with the inner wall of said conduit contiguous to said outlet opening, whereby a substantially inverted U-shaped unobstructed passage is formed solely within said conduit and extending from said open lower end to said outlet opening.

2. A deflector for gas stoves and the like, comprising a conduit having an open lower end forming a free inlet and closed at its upper end and a section in proximity to its closed upper end provided with an outlet opening, an imperforate deflecting plate within said conduit and disposed at an angle to the section provided with said outlet opening and having its lower end in contact with and secured to the conduit between said outlet opening and open lower end and its other end spaced from said closed upper end and section having said outlet opening and its side edges in contact with the inner wall of said conduit contiguous to said outlet opening, and grease absorbing material disposed on side of deflecting plate facing towards said inlet, whereby a substantially inverted U-shaped unobstructed passage is formed solely within said conduit and extending from said open lower end to said outlet opening.

3. A deflector for gas stoves and the like, comprising an upright conduit of substantially elliptical cross section having an inlet at its lower end and a closed upper end and a section in proximity to its upper end provided with a plurality of superimposed and separated transversely arranged elongated outlet openings and a downwardly inclined integral louver extending over each of said outlet openings, an imperforate substantially semi-elliptical-shaped deflecting plate within said conduit disposed at an angle to the section provided with said outlet openings and having its lower end secured to the conduit below said outlet openings and its upper end spaced from said closed upper end and section having said outlet openings and its side edges in contact with the inner wall of said conduit contiguous to said outlet openings, and grease absorbing material disposed on side of deflecting plate facing towards said inlet, whereby a substantially inverted U-shaped passage is formed solely within said conduit.

JOHN WILDER.